(12) United States Patent
Taillefer et al.

(10) Patent No.: US 9,870,879 B2
(45) Date of Patent: Jan. 16, 2018

(54) CONTROLLED SWITCHING DEVICES AND METHOD OF USING THE SAME

(71) Applicant: VIZIMAX INC., Longueuil, Quebec (CA)

(72) Inventors: Pierre Taillefer, Boucherville (CA); Marc Lacroix, Baie D'urfe (CA)

(73) Assignee: VIZIMAX INC., Longueuil (CA)

( * ) Notice: Subject to any disclaimer, the term of this patent is extended or adjusted under 35 U.S.C. 154(b) by 19 days.

(21) Appl. No.: 14/913,794

(22) PCT Filed: Dec. 22, 2014

(86) PCT No.: PCT/IB2014/067248
§ 371 (c)(1),
(2) Date: Feb. 23, 2016

(87) PCT Pub. No.: WO2015/092779
PCT Pub. Date: Jun. 25, 2015

(65) Prior Publication Data
US 2016/0358723 A1    Dec. 8, 2016

Related U.S. Application Data

(60) Provisional application No. 61/919,617, filed on Dec. 20, 2013.

(51) Int. Cl.
*H02J 7/00*   (2006.01)
*H01H 9/56*   (2006.01)
*H02J 3/24*   (2006.01)

(52) U.S. Cl.
CPC .............. *H01H 9/56* (2013.01); *H02J 3/24* (2013.01); *H02J 7/0068* (2013.01)

(58) Field of Classification Search
CPC ....................................................... H01H 9/56
USPC ............................................................ 320/166
See application file for complete search history.

(56) References Cited

U.S. PATENT DOCUMENTS

| 8,766,602 | B1 * | 7/2014 | Kimes | H02H 9/001 |
| | | | | 320/137 |
| 2006/0071639 | A1 * | 4/2006 | Ross | H02J 7/0063 |
| | | | | 320/116 |
| 2010/0270982 | A1 * | 10/2010 | Hausman, Jr. | H02M 5/293 |
| | | | | 320/166 |
| 2011/0254514 | A1 * | 10/2011 | Fleming | H02M 3/158 |
| | | | | 320/166 |
| 2011/0267002 | A1 * | 11/2011 | Baarman | H02J 7/0072 |
| | | | | 320/108 |
| 2013/0049686 | A1 * | 2/2013 | Erhart | H02H 9/025 |
| | | | | 320/109 |

(Continued)

*Primary Examiner* — Suresh Memula
(74) *Attorney, Agent, or Firm* — Robert Brouillette; Brouillette Legal Inc.

(57) ABSTRACT

It is disclosed a technique in which Controlled Switching Devices (CSDs) are used to control medium and high voltage circuit breakers to mitigate switching transients. This invention describes a method for controlling the closing of a circuit breaker to mitigate and/or eliminate the inrush current in capacitive loads such as capacitor banks and filters by taking into account the residual DC voltage charges that may be present in the load. It is disclosed a method to perform fast switching operations on capacitive loads and therefore eliminate the load discharge period.

16 Claims, 7 Drawing Sheets

(56) References Cited

U.S. PATENT DOCUMENTS

| | | | | |
|---|---|---|---|---|
| 2013/0342174 A1* | 12/2013 | Schlak | ................... | H02H 9/002 320/166 |
| 2016/0001672 A1* | 1/2016 | Lee | .................... | B60L 11/1864 320/136 |
| 2016/0152156 A1* | 6/2016 | Pritelli | .................. | B60L 3/0046 320/136 |

* cited by examiner

CONTROLLED SWITCHING DEVICES AND METHOD OF USING THE SAME

CROSS-REFERENCE TO RELATED APPLICATIONS

The present patent application claims the benefits of priority of U.S. Patent Application No. 61/919,617 entitled "CONTROLLED SWITCHING DEVICES AND METHOD OF USING THE SAME" and filed at the United-States Patent and Trademark Office on Dec. 20, 2013, the content of which is incorporated herein by reference.

FIELD OF THE INVENTION

The present invention generally relates to the field of electrical engineering. More particularly, the invention relates to a device and method for fast switching of capacitive loads by controlling the operations of a circuit breaker to mitigate or eliminate the inrush current by taking into account the residual voltage that may be present in this type of load. Examples of capacitive loads are capacitor banks used for reactive compensation, capacitors in harmonic filters and isolated power lines. The present invention also relates to Controlled Switching Devices (CSDs) and methods for using the same.

BACKGROUND OF THE INVENTION

Electric power systems have different types of capacitive loads due to physical characteristics of transmission or distribution lines or due to the addition of capacitors for serial or shunt compensation or for filtering of harmonics. Serial or shunt compensation is used to maintain a constant voltage profile along the distribution or transmission lines. These capacitive loads may be switched on or off, as needed, with a circuit-breaker.

When a capacitor bank is de-energized, some residual DC voltage charges remain in its electrostatic field. As a capacitor bank has self-discharging characteristics, the voltage charges level is dynamic and is decreasing in time from the de-energization to the complete capacitor bank discharge. A capacitor bank may take up to 15 minutes to discharge itself after the breaker opening.

In order to reduce or eliminate the voltage transients such as inrush current caused by a capacitor bank energization, the optimal moment to switch on a discharged capacitor is at the zero crossing of the voltage on the waveform. To perform this operation at the exact moment, a CSD is needed. In normal operation conditions in a typical electrical network, capacitor banks may be switched several times a day.

Many applications require the use of capacitive load switching. For example, distributed energy resources (DERs) integration, static VAR compensator (SVC) and static synchronous compensator (STATCOM) systems may switch capacitor banks several times per day to achieve voltage regulation. However, with current technologies, when capacitor banks are de-energized, a power system or DER operator needs to wait until the complete discharge of the capacitors before energizing them again in order to avoid the inrush current on the network. The inrush current (2), shown in FIG. 1, illustrates the result of an uncontrolled switching operation of a capacitive load on the network. The consequences of such inrush current may be critical as they may damage the equipment, hence reducing the reliability of the system. In this example, the voltage (1) is also illustrated. Furthermore, the resulting transients may travel on the lines and trip a protection reducing then the stability of the network and potentially leading into a major blackout.

Current technologies reduce the inrush current on capacitor banks by using either pre-insertion resistors or CSDs. However, with such solutions, capacitor banks need to be discharged in order to avoid the inrush current when performing the switching operations. Furthermore, the 15 minute waiting time for capacitor discharge is problematic as it does not allow the power system and DER operators to switch at their convenience resulting in a non-optimal operation of their installations.

In many cases, a blocking timer is used to control the circuit breaker closing to avoid operation when capacitive loads are still charged. The timer is armed each time the breaker is opened thus blocking the closing of the breaker.

There is thus a need for a new technique to reduce the switching time of capacitive load while minimizing the inrush current.

SUMMARY OF THE INVENTION

This invention relates to devices and methods achieving fast switching of capacitive loads by means of controlling the closing of a circuit breaker (CB) with the objective of mitigating and/or eliminating the inrush current generated by capacitive load energization. More specifically, such devices and methods determine the optimal electrical switching angle of the CB according to the magnitude and the polarity of residual DC voltage charges that may be present in the load. The capacitive load residual DC voltage can be evaluated or measured by the CSD. The invention also describes a technique to evaluate the residual voltage value in the capacitive load after the circuit breaker opening and a technique to estimate the varying DC residual voltage over time. Thanks to this approach, the CSD is able to close the circuit breaker at any time after its opening, achieving then capacitive load fast switching.

According to one object of the present invention, the present invention discloses a method for lowering the inrush current resulting from a capacitive load (5) energization in an electrical circuit comprising a circuit breaker (4). The method comprises the step of providing the electrical circuit with a controlled switching device (6) adapted to send a close command to the circuit breaker (4) in order to synchronize its mechanical operation to reduce transients sent to the electrical circuit. In this example, the CSD is connected to the network's potential transformers (7) and current transformers (8). The power source (3) is also illustrated. The said method allows the fast switching of the capacitive load. In a preferred embodiment, when the CB of a capacitive load is open, the method allows the reclosing of said CB a few milliseconds following the opening.

In another object of the present invention, the method disclosed herein further comprises the step of adjusting the CSD to close the breaker of the electrical circuit at an optimal electrical angle to reduce the inrush current to allow the fast switching of the capacitive load.

In a further object of the present invention, the controlled switching device is connected to a capacitive load. The method then further comprises the step of calculating residual voltage charges inside the capacitive load in order to calculate the optimal electrical angle on which to switch the breaker.

In another object of the present invention, the method disclosed herein comprises the step of reducing or eliminating the inrush current during the energization of the capacitive load despite its residual DC voltage.

The present invention uses a controlled switching device to control a capacitive load energization by closing a circuit breaker of an electric circuit at an optimal electrical angle to reduce an inrush current provided to the electrical circuit.

The said inrush current reduction is achieved through the use of a Controlled Switching Device, alternatively known as a Point on Wave (POW) controller.

As found in prior art, the capacitive load discharge period may take up to 15 minutes. Thus, each time a capacitive load is switched off (de-energized), either by using a protection trip or by sending a voluntary command, the installation operator needs to wait for the capacitive load to be fully discharged before energizing it. With this invention, each time the circuit breaker is switched off, the current and voltage waveforms are captured, hence determining the residual voltage trapped in each phase of the capacitive load. Furthermore, the capacitive load residual voltage is constantly estimated by the CSD in order to dynamically compute the optimal electrical closing angle according to the source voltage and the network frequency.

In another object of the present invention, a method allowing fast switching of capacitive loads of an electrical circuit is disclosed. Such electrical circuit comprises a breaker, a capacitive load and being electrically fed with an electrical current, the method comprising the steps of providing the electrical circuit with a controlled switching device (CSD) adapted to send an open or close command to the breaker prior to complete de-energization of the capacitive load in order to synchronize an open and close mechanical operation to reduce an inrush current sent to the electrical circuit.

In a further object of the present invention, the said method may further comprise the step of sending a close command to the breaker even though the residual voltage level is different than zero. The said method may also further comprise the step of measuring the angle to re-energize the capacitive load when the voltage of the electrical current is equal to the capacitive voltage.

The method may further comprise automatically adjusting the electrical switching angle of the breaker based on a further step to measure the level of the capacitive load voltage.

In a further object of the present invention, an electric circuit allowing fast switching of capacitive loads is disclosed. The said electrical circuit is electrically fed with an electrical current and comprises a breaker, at least one capacitive load outputting a residual voltage and a controlled switching device (CSD) adapted to send an open or close command to the breaker prior to complete de-energization of the capacitive load in order to synchronize an open and close mechanical operation of the breaker to reduce an inrush current sent to the electrical circuit.

In another object of the present invention, the use of a controlled switching device (CSD) in a circuit comprising a breaker and a capacitive load is disclosed, wherein the CSD is adapted to send an open or close command to the breaker prior to complete de-energization of the capacitive load in order to synchronize an open and close mechanical operation of the breaker to reduce an inrush current sent to an electrical circuit comprising the controlled switching device and at least one capacitive load.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel controlled switching device and method using the same will be described hereinafter. Although the invention is described in terms of specific illustrative embodiment(s), it is to be understood that the embodiment(s) described herein are by way of example only and that the scope of the invention is not intended to be limited thereby.

This invention relates to the fast switching of capacitive loads by controlling the operations of a CB to mitigate and/or eliminate the inrush current using a CSD, wherein the CSD automatically determines the optimal electrical switching angle of the CB according to the magnitude and the polarity of residual DC voltage charges trapped in the load. The CSD evaluates or measures the residual DC voltage on the capacitive load. A technique for evaluating the DC residual voltage ($V_i$) in the capacitive loads resulting from the circuit breaker opening as well as a technique to evaluate the varying DC residual voltage over the time are also disclosed.

Figure 2:
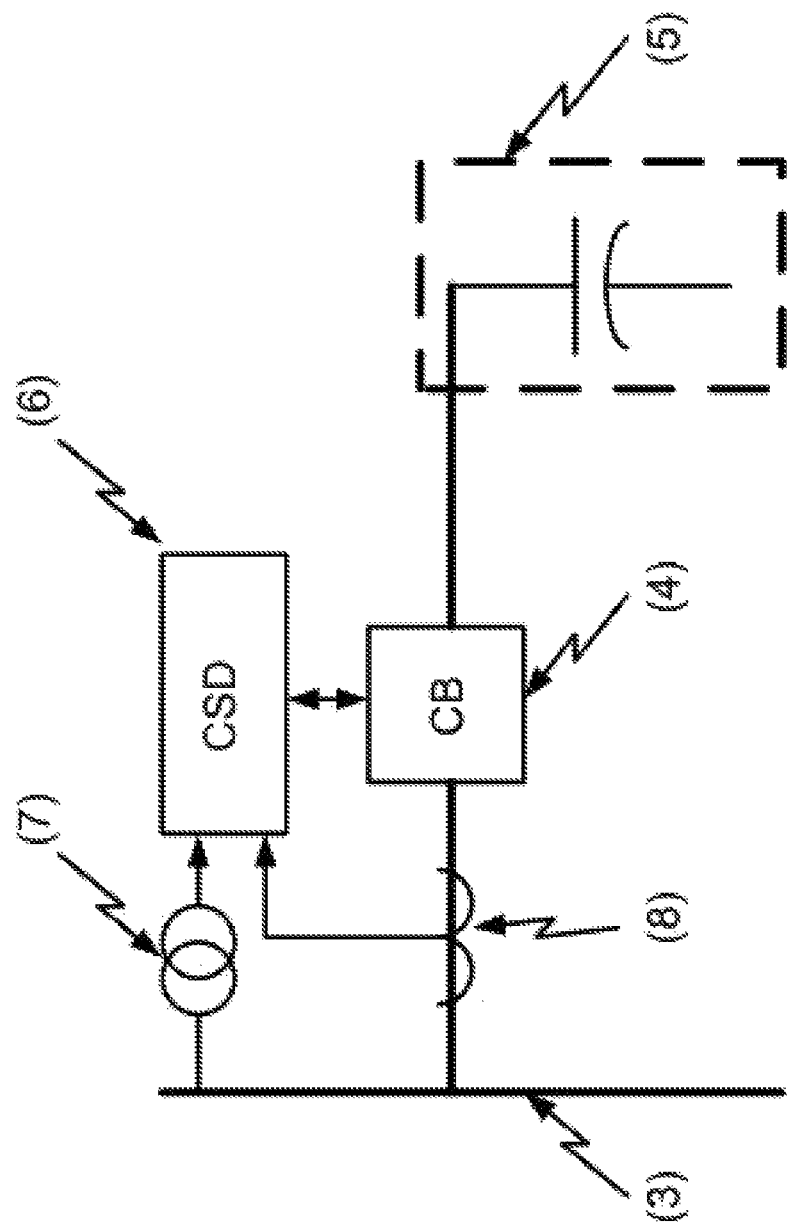
FIG. 2 illustrates a typical capacitive load circuit controlled using a CB comprising a CSD (Prior Art).

Now referring to FIG. 2, an example of a medium or high voltage capacitor bank switching circuit or installation achieving VAR compensation, voltage regulation and harmonic filtering is shown. Such an installation typically comprises a CSD (6) and a capacitive load (5) generally connected to the power source (3) via a circuit breaker (4). The CB (4) controls the energization of the capacitive load (5).

Typically, a CSD is used to control the closing operation of the circuit breaker in order to mitigate and/or eliminate the inrush current associated to the capacitive load energization. In such case, a waiting period for energizing a capacitive load is mandatory as the residual DC voltage is not taken into consideration.

Figure 3:
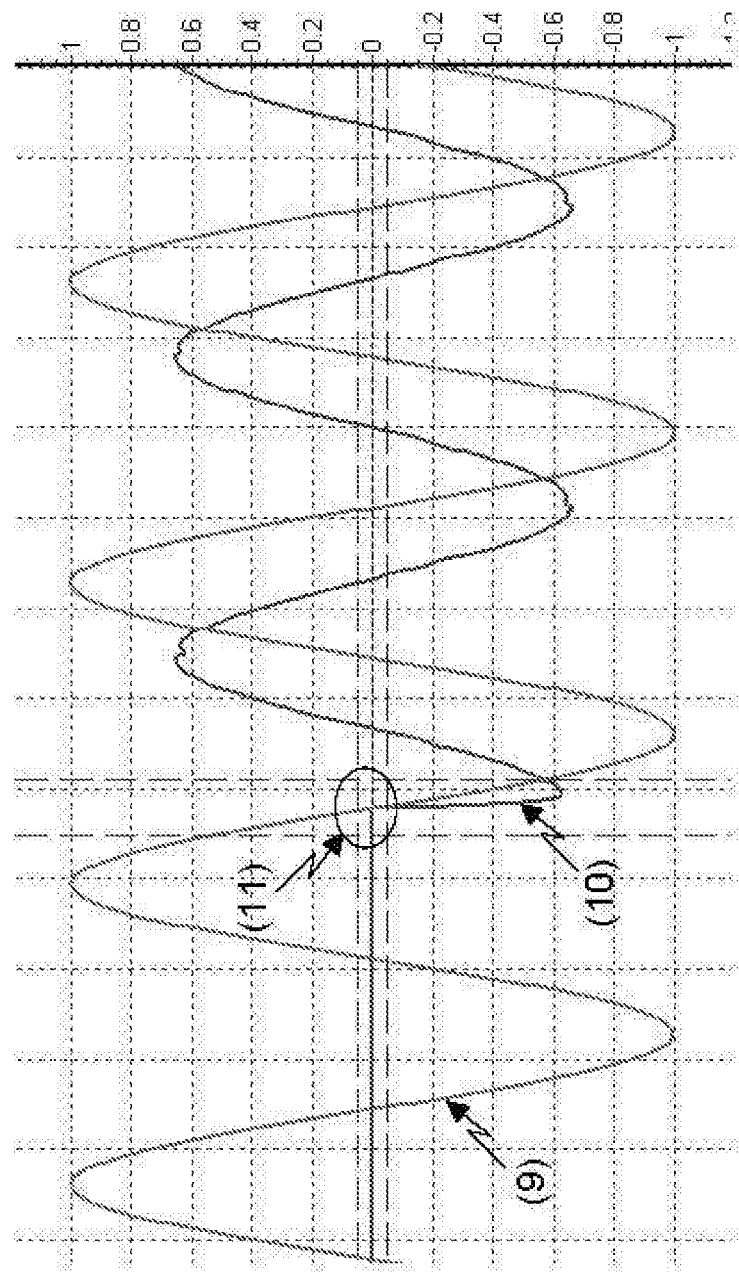
FIG. 3 graphically illustrates an example showing a controlled current energization of capacitive load FIG. 4 graphically illustrates a technique to evaluate the DC residual charge from the measurement of the load/CB current and the source voltage measurement in accordance with the principles of the present invention.

Now referring to FIG. 3, an example of waveforms captured after a capacitor bank switching operation performed by a CSD is illustrated. A capacitor bank shall be switched on when the value of the source voltage (9) is near zero. Such near zero-value switching allows inrush current to be minimized. In such an embodiment in accordance with the principles of the present invention, the capacitors are fully discharged or the residual voltage is taken into account.

Figure 1:
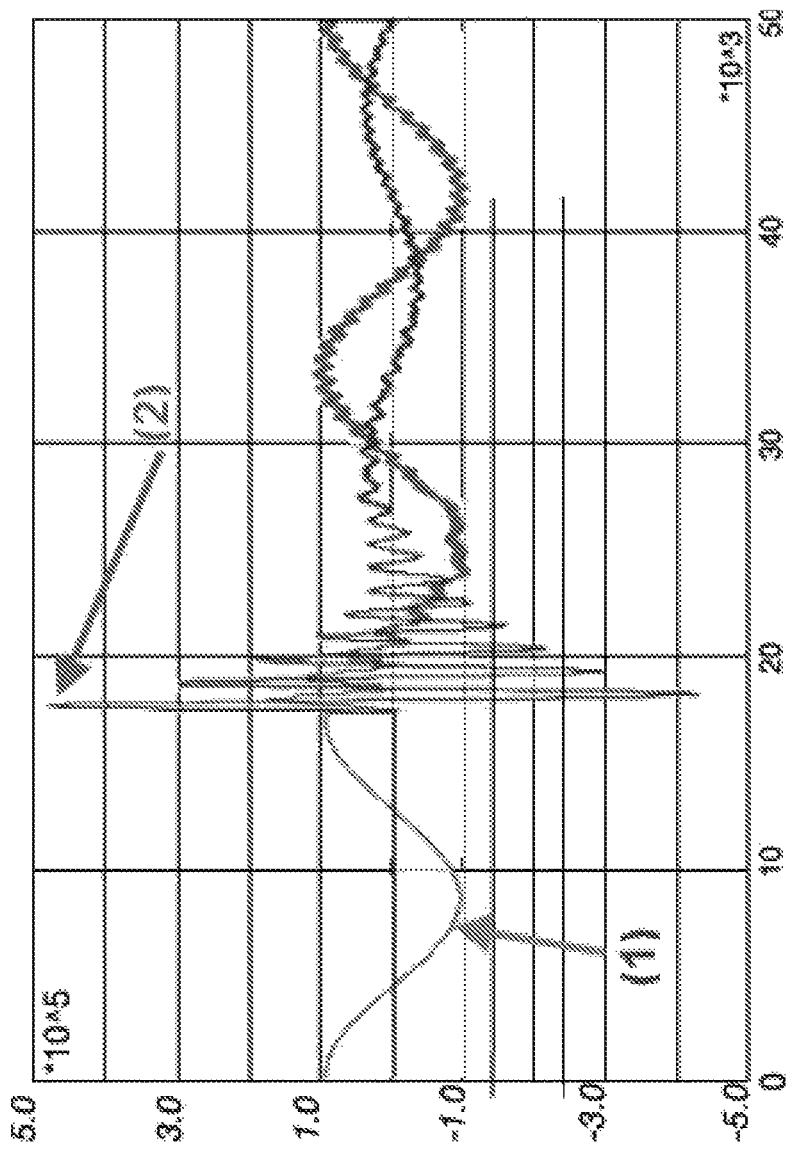
FIG. 1 graphically illustrates an example of inrush current as a function of time (Prior Art).

Still referring to FIG. 3, the CB is close at the electrical switching angle (11) and the load current (10) is shown varying in time. Such result shows a significant improvement from the result shown in FIG. 1. As illustrated in FIG. 1, the inrush current (2) from an uncontrolled capacitor bank energization reaches more than 4 PU compared to the controlled capacitor switching by a CSD, as shown in FIG. 3, where no inrush current (10) is generated.

Figure 4:
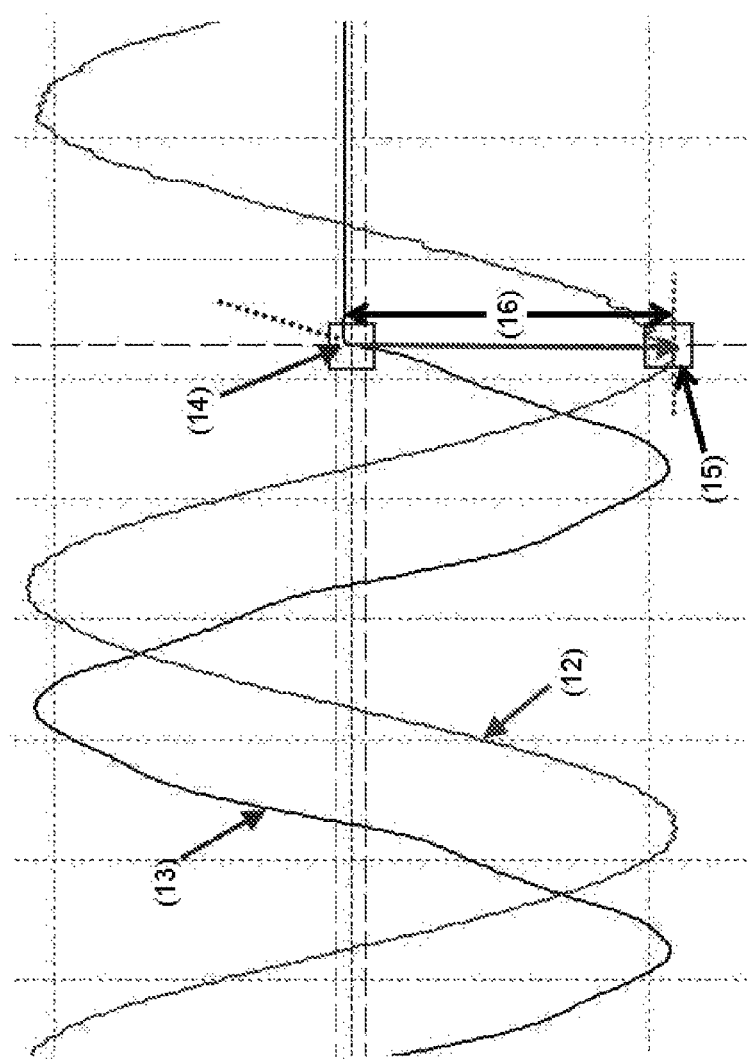

Now referring to FIG. 4, a graphical example of residual voltage (16) resulting from the de-energization of a capacitor load is shown. The de-energization of a capacitive load causes an initial DC residual voltage (16) in the said capacitive load. At the time of opening of the CB, the magnitude and the polarity of $V_i$ (16) will depend on to the level or magnitude of the source voltage (12) and on the polarity of the voltage at the time of the current interruption (14). A controlled switching device according to the principles of the present invention monitors the circuit breaker/load current (13) to determine the time of current interruption (14) and $V_i$ (16) calculation. The value of $V_i$ is typically calculated using the following equation $$V_i = K \cdot V_m,$$

where $V_i$ is the DC residual voltage value in a capacitive load (at t=0)

Figure 5:
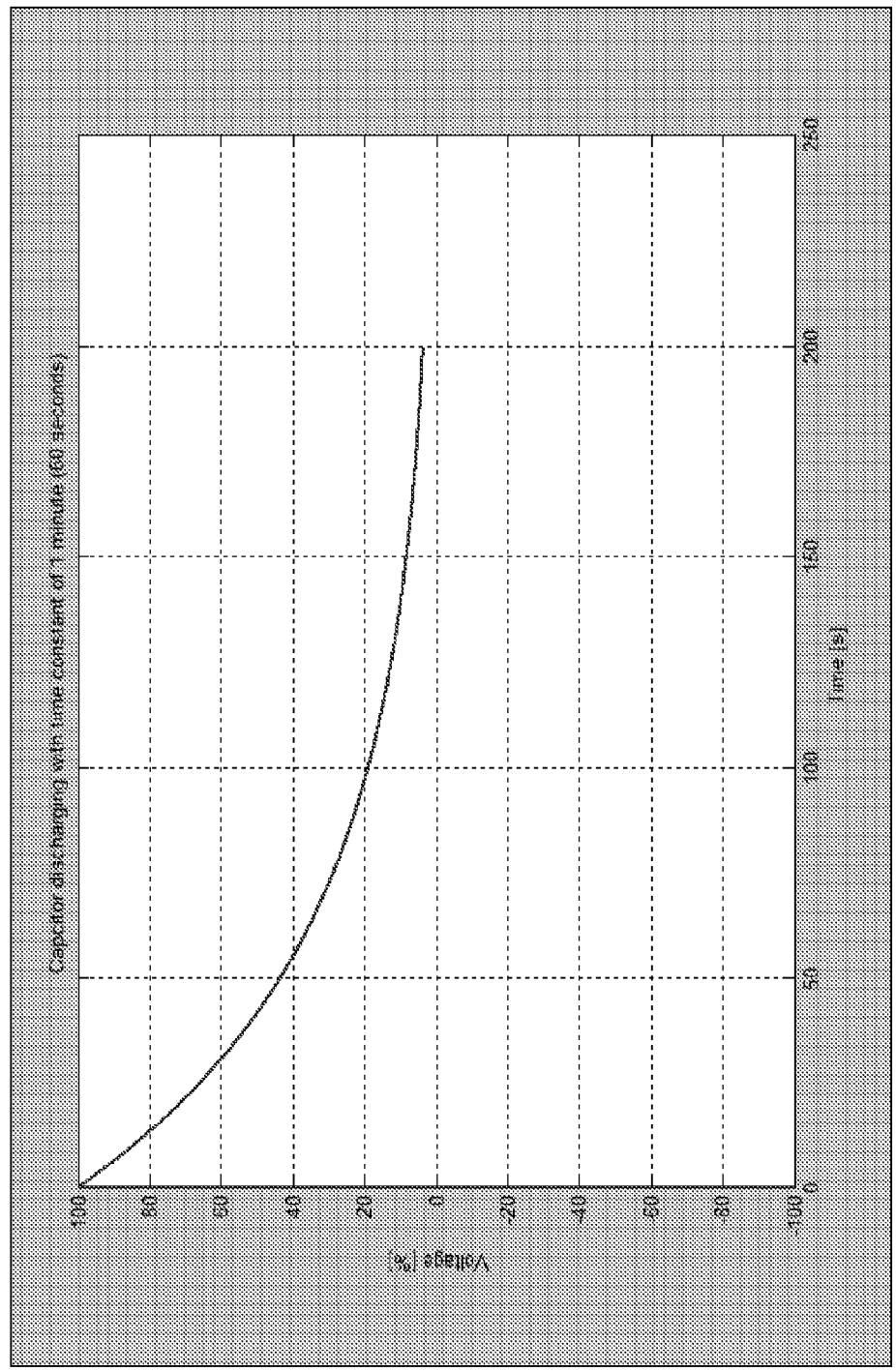
FIG. 5 graphically illustrates a typical capacitor residual voltage curve as a function of time in seconds and using a capacitor discharging having a 1-minute constant showing a typical capacitor self-discharged event.

K is the correction factor based of physical characteristics of the electrical circuit $V_m$ is the AC instantaneous voltage value Now referring to FIG. 5, a curve of the voltage characteristics of a capacitive load slowly decaying as a function of time is shown. In a typical capacitive load application, the discharging of one or more capacitive loads from a $V_i$ value to a value providing a safe level may last up to around 15 minutes. Using $V_i$, decaying voltage curve characteristics and elapsed time from the time of opening of the CB, a CSD according with the principles of the present invention estimates the magnitude and the polarity of the residual charge in the capacitive load. One skilled in the art shall understand that the principles of the present invention may be applied to any level and duration of discharge of one or of a plurality of capacitive units.

A CSD, also known as Point on Wave (POW) controller, is an intelligent controller designed to send open or close commands to a circuit breaker in order to synchronize mechanical operations of the CB with at least one electrical signal present on a network. The mechanical operation of the CB is preferably selected at an optimal electrical angle in order to decrease or eliminate switching transients.

To mitigate and/or eliminate the inrush current generated by a capacitive load energization, abrupt voltage changes shall be avoided. Therefore, the optimal electrical angle to re-energize the load using at least one circuit breaker is estimated at time where the source voltage is equal to $V_i$. This corresponds to the electrical angle where the voltage across the CB is equal to 0.

Figure 6:
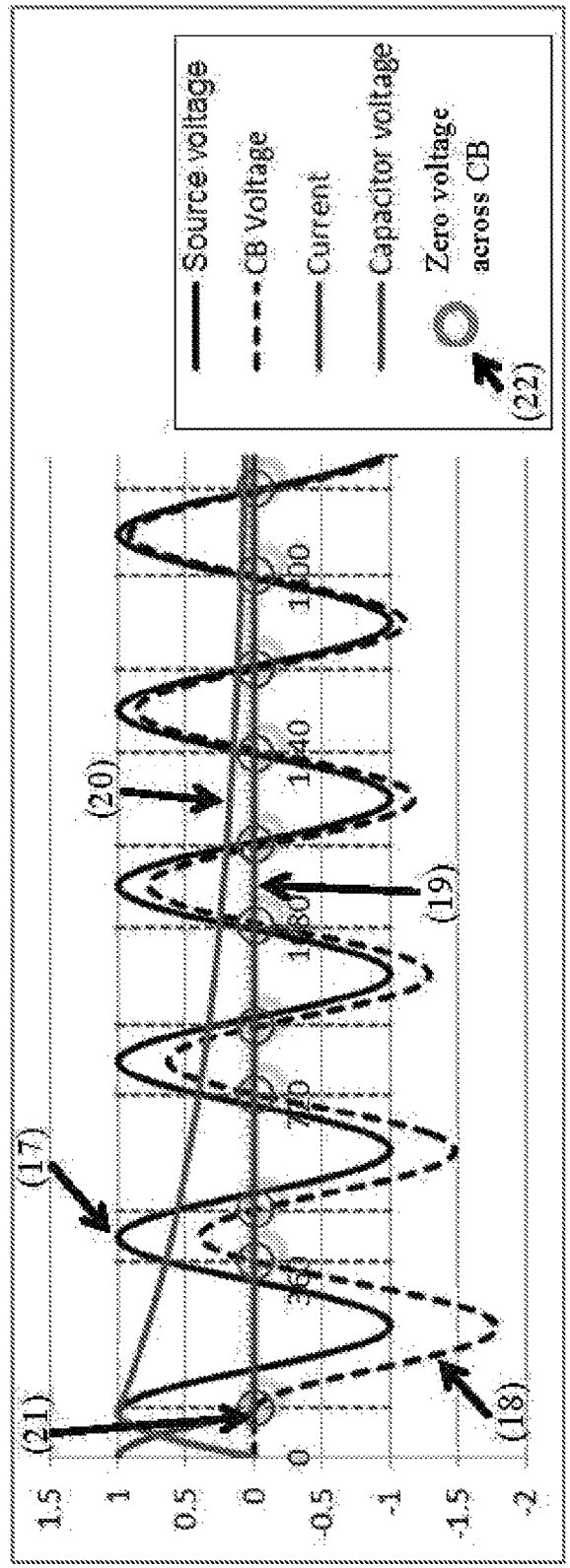
FIG. 6 graphically illustrates an optimal switching electrical angle according to the source voltage and the varying DC residual voltage.

For example, FIG. 6 illustrates the variation of the source voltage (17), the voltage across the CB (18), the current (19) and $V_i$ (20) as a function of time. After the opening of the CB (21), the voltage across the CB reaches zero at least one time but typically a plurality of times (22). The CB may be closed at any time where the voltage of the CB reaches zero. As the voltage $V_i$ is slowly decreasing over the time, the optimal switching point is therefore dynamic and also changing over the time. When a command is sent to the CSD, the time of the CB closing event has to be calculated in order to optimize taking into account $V_i$. The present CSD uses $V_i$ to dynamically adapt the closing time of the CB in order to avoid abrupt changes in the capacitive load voltage and to mitigate and/or avoid inrush current. Thus, this approach allows fast switching of capacitive loads.

Figure 7:
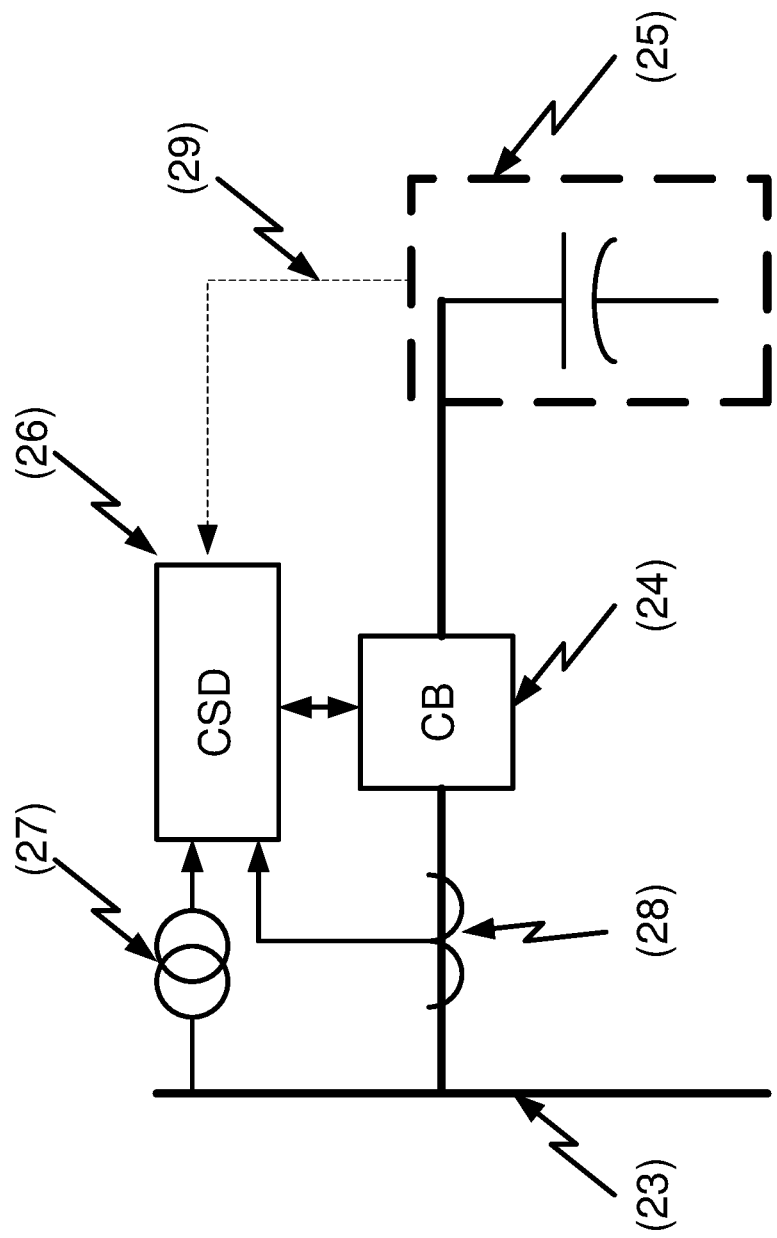
FIG. 7 illustrates a typical capacitive load circuit installation comprising a CB using a CSD which measures the varying DC residual voltage performed by the CSD in accordance with the principles of the present invention.

Now referring to FIG. 7, an embodiment of the present invention allowing the dynamic variation of the switching of the electrical angle of the CB of a circuit is shown. This embodiment is based on an installation similar to the circuit illustrated in FIG. 2 but comprises a CSD (26) which controls the CB (24) which is connected directly to the capacitive load (25). Such configuration allows DC residual voltage measurement (29). The power source (23), the potential transformers (27) and the current transformers (28) are also illustrated.

One of skilled in the art shall understand that any prior art other electrical components or future derivatives of such components, such as, but not limited to, breakers, current and potential transformers, capacitive loads, POW and CSD may be used in association with the present method. In particular, the U.S. patent no. U.S. Pat. No. 6,433,980 B1 discloses the main functionality of a CSD that can be used herein. Also, the U.S. Pat. No. 7,576,957 B2 describes the main functionality of a POW that can be used herein. The content of U.S. Pat. No. 6,433,980 B1 and U.S. Pat. No. 7,576,957 B2 are enclosed herewith by reference.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

What we claim is:

1. A method allowing fast switching of capacitive loads of an electrical circuit comprising a breaker, a capacitive load and being electrically fed with an electrical current, the method comprising the steps of providing the electrical circuit with a controlled switching device (CSD) adapted to send an open or close command to the breaker at any time prior to complete de-energization of the capacitive load in order to synchronize an open and close mechanical operation to reduce an inrush current sent to the electrical circuit.

2. The method of claim 1, further comprising the step of sending a close command to the breaker when the residual voltage level has decreased to a predetermined level.

3. The method of claim 1, further comprising the step of measuring the angle to re-energize the capacitive load when the voltage of the electrical current is equal to the capacitive voltage.

4. The method of claim 1, the method further comprising automatically adjusting the electrical switching angle of the breaker.

5. The method of claim 4, wherein the electrical switching angle of the breaker is based on a further step to measure the level of the capacitive load voltage.

6. The method of claim 1, wherein the method further comprises a step to monitor the circuit breaker/load current to determine time of current interruption and $V_i$ calculation.

7. The method of claim 6, wherein the calculation of $V_i$ is calculated by resolving $V_i = K \cdot V_m$, wherein $V_i$ is DC residual voltage value in a capacitive load (at t=0), K is a correction factor based of physical characteristics of the electrical circuit and $V_m$ is AC instantaneous voltage value.

8. An electric circuit allowing fast switching of capacitive loads, wherein the electrical circuit electrically is fed with an electrical current and comprises a breaker, at least one capacitive load outputting a residual voltage and a controlled switching device (CSD) adapted to send an open or close command to the breaker at any time prior to complete de-energization of the capacitive load in order to synchronize an open and close mechanical operation of the breaker to reduce an inrush current sent to the electrical circuit.

9. The electric circuit of claim 8, wherein the CSD is adapted to determine the optimal electrical switching angle of the breaker according to the magnitude and the polarity of residual direct current voltage charges to allow the fast switching of capacitive loads.

10. The electric circuit of claim 8, wherein the CSD is adjusted to measure the electrical angle to re-energize the capacitive load.

11. The electric circuit of claim 10, wherein the CSD is adapted to dynamically adjust the closing of the breaker when the voltage of the electrical current is equal to the capacitive load voltage.

12. The electrical circuit of claim 8, wherein the CSD is adapted to monitor the circuit breaker/load current to determine and to optimize time of current interruption and $V_i$ calculation.

13. Use of a controlled switching device (CSD) in a circuit comprising a breaker and a capacitive load to send an open or close command to the breaker at any time prior to complete de-energization of the capacitive load in order to synchronize an open and close mechanical operation of the breaker to reduce an inrush current sent to an electrical circuit comprising the controlled switching device and at least one capacitive load.

14. Use of a CSD of claim 13, wherein the CSD is adapted to determine the optimal electrical switching angle of the breaker according to the magnitude and the polarity of residual direct current voltage charges to allow fast switching of capacitive load.

15. The electric circuit of claim 11, wherein the CSD is adjusted to measure the electrical angle to re-energize the capacitive load.

16. The electric circuit of claim 13, wherein the CSD is adapted to dynamically adjust the closing of the breaker when the voltage of the electrical current is equal to the capacitive load voltage.

* * * * *